April 26, 1960 L. SHAKESBY 2,934,136
JOINT FOR SPOKE TIGHTENING TOOL
Filed Dec. 2, 1957 2 Sheets-Sheet 1

INVENTOR
LEONARD SHAKESBY
BY Featherstonhaugh & Co.
ATTORNEYS

April 26, 1960 L. SHAKESBY 2,934,136
JOINT FOR SPOKE TIGHTENING TOOL

Filed Dec. 2, 1957 2 Sheets-Sheet 2

INVENTOR
LEONARD SHAKESBY
BY Featherstonhaugh & Co
ATTORNEYS

United States Patent Office 2,934,136
Patented Apr. 26, 1960

2,934,136

JOINT FOR SPOKE TIGHTENING TOOL

Leonard Shakesby, Toronto, Ontario, Canada, assignor to Canada Cycle and Motor Company Limited, Toronto, Ontario, Canada Application December 2, 1957, Serial No. 699,994

2 Claims. (Cl. 157—1.5)

This invention relates to spoke tightening machines.

The general as well as the specific embodiment of the invention to be described in reference to the drawings in which.

Figure 1:
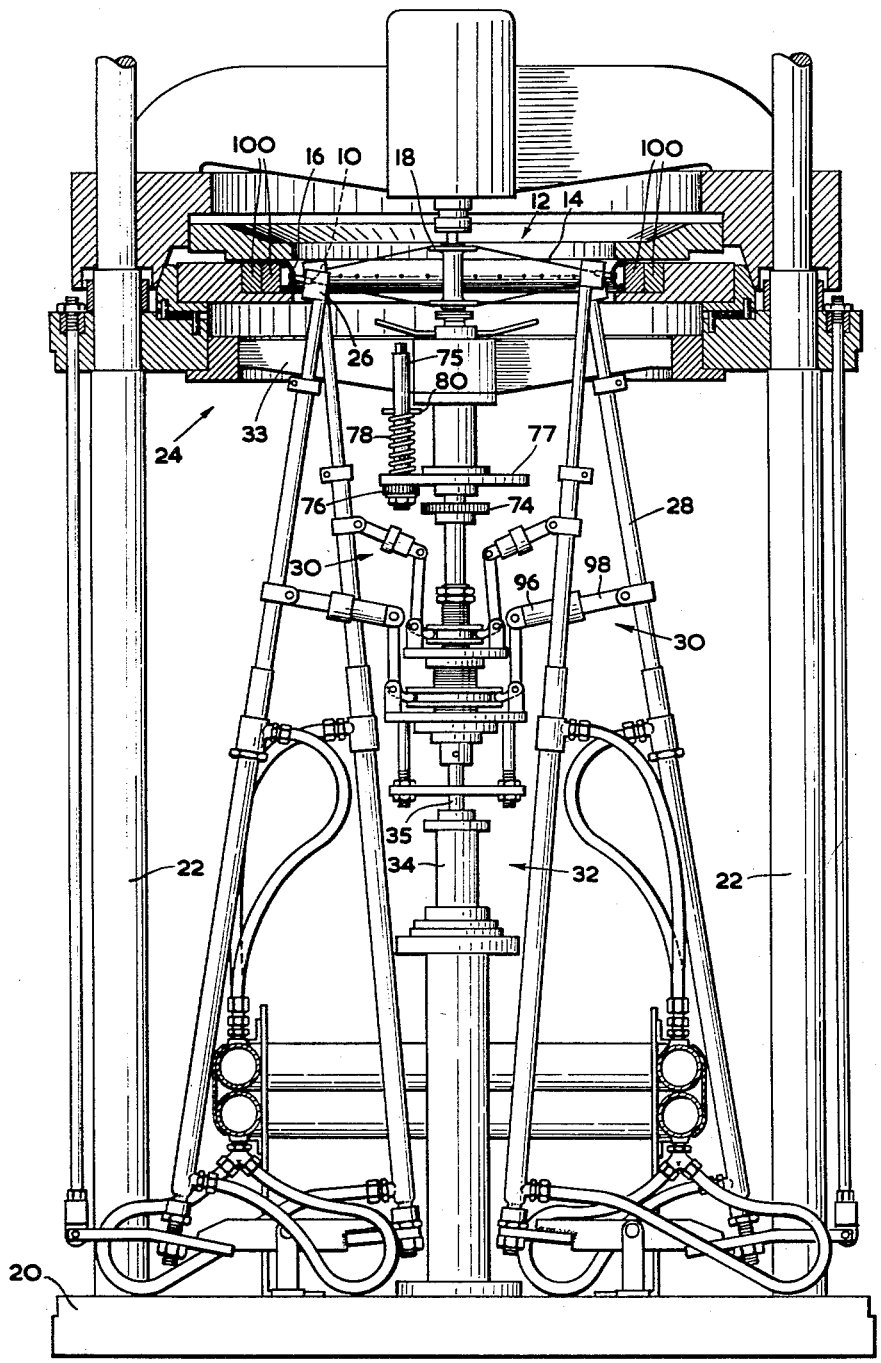
Figure 1 is a general illustration of a spoke tightening machine.
Figure 2:
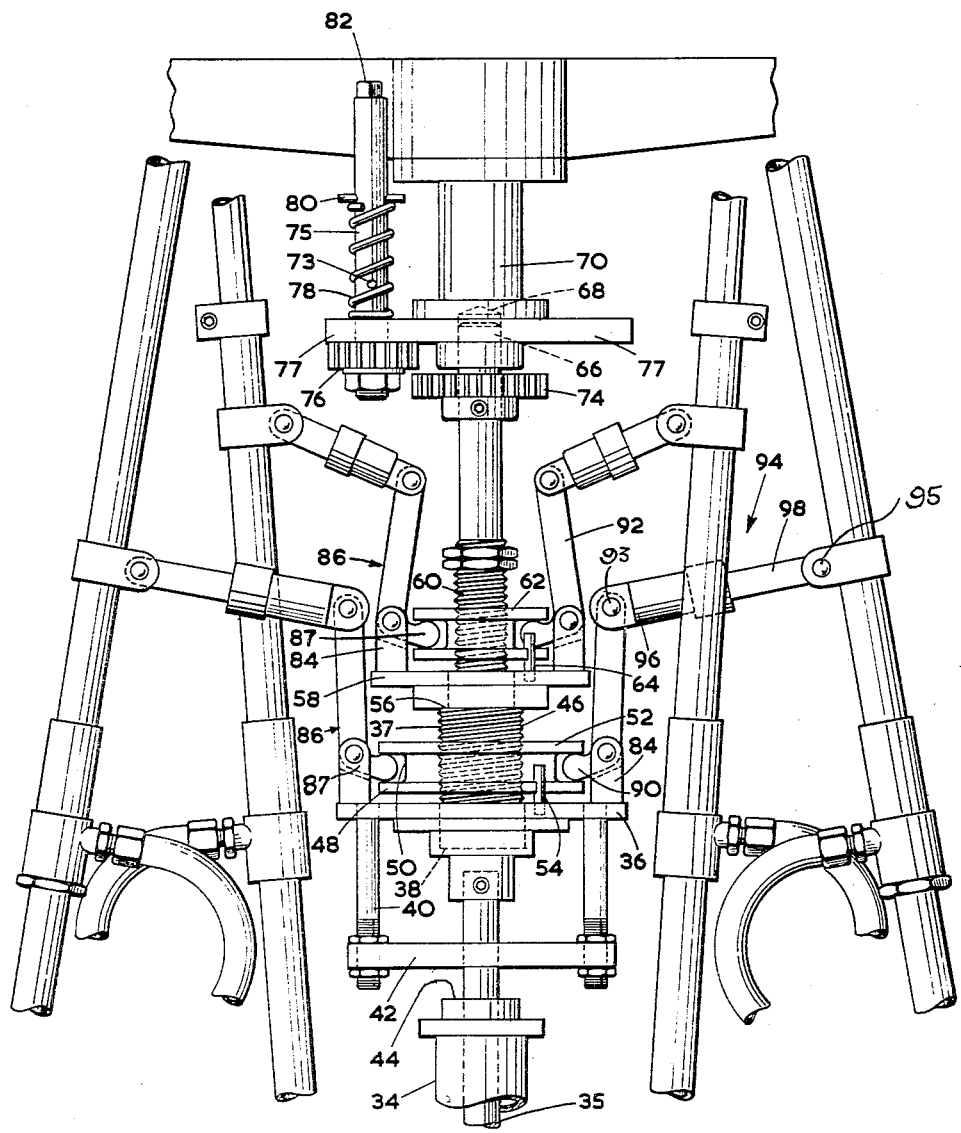
Figure 2 is an enlarged view of the inventive features thereof.

Figure 1 illustrates the main component of a spoke tightening machine for tightening spoke nipples 10 of a bicycle wheel 12, the wheels 12 being of the type wherein the spokes 14 extend from the wheel rim 16 to the ends of the wheel hub 18 and wherein alternate spokes 14 extend to opposite sides of said hub. The machine is provided with a base 20 and a frame 22 mounted thereon. The frame 22 is provided with means 24 for supporting a wheel in a position spaced from said base 20.

By the "wheel axis" in the following description I mean the imaginary line extending on either side of the wheel and being the location of the rotary axis thereof when the wheel is properly supported on means 24. By "inwardly" and "outwardly" I mean respectively "radially inwardly" and "radially outwardly" relative to the wheel axis. The machine is provided with a number of spoke tightening heads 26 (preferably of the type described in U.S. Patent No. 2,896,697) corresponding to the number of spokes 14, each head 26 being adapted to contact one spoke nipple. A tubular member 28 supports each head 26. The tubular members 28 support each head in a position to receive a bicycle wheel spoke 14 inwardly of the nipple. Each tubular member is operable (preferably hydraulically) to move each head outwardly along the spoke to the spoke nipple wherein means contained in the head 26 are adapted to connect to and rotate the nipple 10. A gear rack (not shown) slidable in the tubular member 28 is adapted to rotate the gear keying means on hydraulic actuation and thereby tighten the spoke nipple. The tubular members 28 each extend toward the base and generally perpendicularly to the spoke 14 to which they correspond and are supported preferably as described in U.S. Patent No. 2,892,490.

The machine as so far described operates in the following manner:

The heads 26 in the rest position are located, in such rest position to contact and receive the individual spokes inwardly of the nipples. Means forming one of the features of this invention are then operable to move the tubular members 28 outwards relative to the axis of a wheel 12 whereby the head 26 receives the spoke nipples for rotation thereof by the rack contained in the tubular member 28. When the spoke nipples have been rotated and tightened, the means in accord with this invention move the tubular members radially inward so that the heads 26 move inwardly along the spoke from the head 26, whereupon the wheel is removed, another wheel laid in position with its spokes received in the head 26, and the cycle is repeated.

Although the particulars of the radial movement of the tubular members 28 have not been explained, it will be obvious that adjustment of the radial location of the heads 26 should be made for different size wheels. Thus this invention provides means for such adjustment which acts independent of the cyclical motion in the actual spoke tightening movement of tubular members 28.

Thus it will be seen that alternate tubular members 28 extend from the wheel rim 14 toward and away from the wheel axis in their extent away from wheel 12. The tubular members 28 are so supported on said base in such a way as to allow pivotal movement thereof in a generally radial direction relative to the wheel axis and are controlled in such movement by linkages 30 attached to a central member 32 concentric with the wheel axis extending from said base to the vicinity of said wheel.

These linkages are the subject of this invention.

The central member 32 extends from the base to a cross head 33 on the framework adjacent and below the wheel location. The central member 32 comprises an hydraulic cylinder 34 mounted on said base 20 with a piston rod 35 extending upwardly therefrom. A shelf member 36 of circular shape is attached to the upper end of the piston rod 35 and forms a thrust bearing for a rotatable shaft 37 seated in a socket 38 therein. A pair of bolts 40 extending downwardly from the circular shelf 36 mount a cross arm 42 which is located to bear upon the upper face 44 of the piston cylinder 34 and therefore to limit downward movement of the piston rod 35 relative to the cylinder 34. The rotatable shaft 37 is, in the vicinity of the shelf 36, provided with a relatively thick diameter and threading 46 on the outside thereof which threadedly mounts a spool member 48 having a groove 50 defined by radially extending upper and lower flanges 52. The spool member 48 is held against rotation relative to the shelf 36 by a dowel 54 which allows axial movement of the two members relative to one another.

The shaft 37 is narrowed to a smooth portion above the threading 46 forming a shoulder 56 to mount thereon a second circular shelf 58. Above the smooth portion of the shank there is provided a second threaded extent 60 on which is mounted a second spool 62, similar to spool 48 and connected by dowel 64 to the second shelf 58 to prevent rotation therebetween. The upper extremity of the shaft 37 is adapted to rotate in bore 68 in a downward projection 70 from the cross head 33.

Bore 68 is made sufficiently deep to accommodate the upper extremity of shaft 37 in the uppermost position reached during its oscillatory movement, to be described hereinafter. A gear wheel 74 is attached to the shaft 37 a short distance below projection 70. A plate 77 rigidly attached to downward projection 70 of the cross head a short distance above the gear wheel 74 slidably mounts a spindle 75 on the lower end of which is provided a gear wheel 76. A compression spring 78 coiled about the spindle 75 bears at its lower end on the plate 77 and at its upper end on a pin 80 on the spindle 75; and hence biases the spindle 75 to an uppermost position wherein the gears 74–76 are out of mesh. The upper end of the spindle 75 is provided with a key projection 82 whereby a crank or wrench may be attached thereto to move the spindle 75 downwardly until the gears mesh and hence to rotate the main shaft 37 through gear 72. A stop member 73 on the spindle 75 prevents downward movement of the gear wheel 76 below the meshing position.

Each of the shelves 36, 58 is provided with a set of upwardly extending ears 84 adjacent the periphery thereof to pivotally mount bell cranks 86 thereon. The pivotal mounting for the bell cranks is preferably parallel to a plane at right angles to the wheel axis and is perpendicular to a radius from the wheel axis. The bell cranks 86 on each shelf 36 or 58 correspond to alternate tubular members 28, bell cranks 86 on the lower shelf correspond to the inwardly extending tubular members 28 and the bell cranks 86 on the upper shelf corresponding to the outwardly directed tubular members 28. The bell cranks 86 are provided with short lower arm 87 directed inwardly toward the axis having a rounded button 90 held between the upper and lower flanges 52 of the spool member 48 or 62 to be moved thereby. The other arm 92 of each bell crank 86 extends upwardly in a roughly axial direction and at its upper extremity is connected pivotally to the inner end 93 of a telescopic arm 94 which at its outer end 95 is pivotally connected to a tubular member 28. The telescopic arm 94 is biased to an extended position in any desired manner such as by providing the inner telescopic member 96 with spring means (not shown) to bias the inner member 98 to such extended position.

The connections to ends, 93—95 for each telescopic arm 94 are located so that the arm slopes upwardly outwardly relative to a plane perpendicular to the wheel axis. Thus upward movement of the inner end 93 relative to the outer end 95 results in a lengthening of the projection of telescopic arm 94 on a plane perpendicular to the wheel axis. If the inner end 93 during such relative movement, is maintained a constant distance from the wheel axis, then it is obvious the outer end 95 will be moved outward. It will be seen that downward movement of the inner end 93 will result in movement of the outer end 95 inward. It is in this way that cyclical movement of the tubular members 28 is achieved.

It will be obvious that the relation of the members 93 and 95 may be reversed so that the inner member is the higher. The same cyclical movement of the tubular members 28 would then be achieved by moving the inner end 93 downward to move a tubular member 28 outwardly and upward to move a tubular member 28 inwardly. The operation of the invention will now be described.

Referring to Figure 1 it will be seen that a bicycle wheel 12 is shown retained in wheel support means 24. The bicycle wheel 12 shown is intended to be the smallest of (say) three sizes. Adaptors 100 are illustrated in the metal member which may be withdrawn for use with a larger size wheel. The threadedly mounted spools 48 and 62 are used to adapt the position of the tubular members 28 to larger or smaller sized wheels. In accordance with the operation of the invention, if a larger sized wheel is to be used, the correct setting may be obtained by putting an adaptor bar of the desired thickness between the lower spool 48 and the upper shelf member 58, placing a crank or wrench on the spindle 75 and moving it downward until it meshes with the shaft spindle 66 and rotating the shaft while the spools 48, 62 are prevented from rotating therewith by dowels 54, 64 and thus spools 48, 62 rise along the shaft 37 until further rotary movement of such shaft is prevented by the adaptor bar between spool 48 and upper shelf member 58.

Movement of spool 48 away from shelf 36 causes the lower flange 52 to move button 90 upwardly, rotating bell crank 86 to move long arm 92 thereof outwardly. This outward movement causes telescopic members 94 to be moved outwardly causing a similar movement of tubular members 28 about their pivotal mounting adjacent the base 20. The movement of tubular members 28 outwardly adjusts the heads 26 to the proper radius for the larger wheel.

Rotation of shaft 37, as described above causes, in a similar manner, movement of spool 62 away from shelf 58, causes the flange 52 to move buttons 90 upwardly moving the remaining bell cranks 86 to move telescopic arm 94 and the remaining tubular member 28 outwardly.

It will be obvious that the spools 48 and 62 can be lowered instead of raised into position, in which case an adaptor bar will be inserted between one of the spools 48, 62 and the respective shelves therebelow.

It will also be obvious that the vertical arrangement of bell cranks, shelves and spools may be reversed so that ears 84 project downwardly from shelves 36 and 58 to mount bell cranks having their longer arms 92 projecting therebelow and their buttons 90 cooperating with spools 48 and 62 mounted below the shelves. Movement of the spool 48 away from shelf 36 or similar movement of spool 62 away from shelf 58 would then cause outward movement of tubular member 28 in accord with the invention.

When the spools have been adjusted to the proper height the crank or wrench is removed and the smaller gear 76 is allowed to move out of mesh. The machine is then ready for operation. When a bicycle wheel is mounted in place the machine is actuated to bring the spoke tightening heads 26 into contact with the spokes 14 inward of the spoke nipples 10. The piston rod 35 is moved upwardly to move the central shaft 37 including the spool members 48 and 62 and the shelf members 36 and 58 upwardly to the upward limits of position of the shaft 37 in the bore 68. Since the respective spools and shelves are rigid with relation to one another in this upward movement, the bell cranks 86 act as rigid members and this upward movement moves the inner end 93 of telescopic arm 94 upward relative to the outer end 95 causing displacement of the outer end 95 away from the wheel axis and consequent movement of the tubular members 28 and heads 26 so that the latter move over the nipples 10 to perform the tightening operation. Preferably the outer movement of the tubular members 28 as required by the movement of the telescopic member 94 is slightly greater than that required for each head 26 to contact the respective spoke nipple 10, so that each telescopic member may shorten against the bias of the spring to the extent required by the location of the individual spoke tightening heads relative to the nipples and thus minor variations in the member locations may be compensated for. When the tightening operation is completed, the piston rod 35 and the shaft 37 move downwardly, and again the bell cranks move without rotation, the pivotal connection 93 to the telescopic arm thus increasing the angle between the telescopic member and the horizontal. This requires inward movement of the tubular member 28 which acts to remove the spoke tightening head 26 from the nipple and to allow removal of the wheel.

What I claim as my invention is:

1. In a spoke tightening machine having a base, a frame mounted thereon adapted to hold the wheel of a bicycle whose spoke nipples are to be tightened, a head adapted to contact each spoke nipple, and a tubular member for supporting each said head pivotally mounted on said base to permit movement of said tubular member adjacent said head inwardly and outwardly from the wheel axis; a central shaft rotatably and reciprocally mounted on the base, at least one shelf mounted on and rotatably receiving said shaft, a spool, provided with upper and lower flanges, threaded on said shaft, a bell crank corresponding to each tubular member pivotally mounted on said shelf having a first arm pivotally retained between said upper and lower flanges, and a second arm having a component parallel to said central axis, said second arm being pivotally connected to its respective tubular member to translate outward and inward movement thereof into outward and inward movement of said tubular member, means preventing relative rotational movement between said shelf and the spool but allowing relative axial movement therebetween, and means causing cyclical movement of said tubular members inwardly and outwardly without relative movement between said respective spools and shelves.

2. In a spoke tightening machine as claimed in claim 1 wherein the axis of pivotal mounting of said bell cranks on said shelf is contained in a plane perpendicular to said central shaft and is perpendicular to a radius from said central axis.

References Cited in the file of this patent

UNITED STATES PATENTS

| | | |
|---|---|---|
| 1,357,056 | House | Oct. 26, 1920 |
| 1,980,129 | Eksergian et al. | Nov. 6, 1934 |
| 2,536,317 | Shakesby | Jan. 2, 1951 |
| 2,681,692 | Weaver | June 22, 1954 |